Patented Apr. 23, 1935

1,998,923

UNITED STATES PATENT OFFICE 1,998,923

METHOD OF CLEANING BALATA AND LIKE GUMS

Fayette Dudley Chittenden, Nutley, N. J., assignor, by mesne assignments, to United States Rubber Company, New York, N. Y., a corporation of New Jersey No Drawing. Application May 25, 1931, Serial No. 539,991

3 Claims. (Cl. 18—49)

This invention relates to a method of cleaning balata and more especially relates to the preparation of a light colored balata for golf ball covers.

The methods of collecting balata and like gums are such that considerable quantities of foreign matter such as dirt, humus, ligneous matter, organic coloring matter and other substances are present in the gum of commerce. As distinguished from these foreign substances the balata also contains resins in addition to the balata gum. The crude products must be cleaned and the resins removed before they can be used; and especially in the use of balata for golf ball covers, a light colored balata must be produced. The golf ball cover as ordinarily prepared consists of a mixture of balata, rubber, and white coloring pigments such as zinc oxide, zinc sulphide, magnesium carbonate, titanium oxide, etc., and a very important factor in determining the degree of whiteness of the golf ball cover is the color of the balata used. Balata gum when pure is transparent and nearly colorless and the balata resins are light yellow in color. The resins are usually solvent extracted from the balata to be used in golf ball covers, and therefore the color of the final product used in golf ball cover manufacture depends to a very large extent on the effectiveness of the process of cleaning the balata and removing the foreign substances, such as dirt, humus, organic dyes, finely divided carbon and the like.

Two methods of cleaning balata have been in use for some time. In the first method known as the clarifying process finely divided balata is immersed in a cold solvent such as gasoline to dissolve out the resins and some of the soluble foreign matter until the resins are sufficiently extracted, for example, until an acetone soluble fraction of the gasoline treated balata is reduced to about 2%. The thus deresinated balata is then completely dissolved in hot gasoline and the foreign substances such as bark, wood, clay, etc., removed from the solution by centrifuging, settling, filtration or like operations. The balata is recovered from the solvent, preferably by crystallization and drying. In the second method known as the mechanical method the balata is washed in a mill with water in a manner similar to that employed in the washing of rubber thereby removing mechanical impurities to a certain extent. The washed balata is then dried and the resins extracted by treatment with an organic solvent such as cold gasoline. The former clarifying process is expensive and hazardous. The latter mechanical process is satisfactory as long as the block balata supply remains uniform and in very clean condition. Uniform block balata has become increasingly more difficult to obtain and in the cleaning of a large proportion of the block balata today, the latter process, which includes the washing with water in a mill and the subsequent extraction of the resins with an organic solvent, will not give a satisfactory light colored balata for golf ball manufacture.

The process of this invention briefly comprises softening the balata, preferably in boiling water, and then milling into the softened balata, in a suitable washer of the internal type, detergents such as sodium oleate, sodium stearate, other similar soaps, alkaline substances such as caustic soda, trisodium phosphate, sodium silicate, sodium carbonate, sodium meta silicate and the like or mixtures of these substances, and subsequently washing out these detergents, preferably with hot water. This incorporating of the detergents into the balata by a milling operation distributes the detergents uniformly throughout the balata and the thus distributed detergents are absorbed by the foreign substances which it is desired to remove from the crude balata. In addition, the incorporation of detergents by milling into the gum serves to lead water into the interior during the subsequent washing operation giving a much more thorough and uniform washing of the product. The gum into which the detergents have been milled may be washed continually with water until the wash water runs clear and free from traces of soap or alkali. The washed product may now be dried and the resins extracted from the dried balata by organic solvents in the same manner as in the extraction of the resins in the present day mechanical process as described above.

As a specific illustration of one manner of carrying out the invention, but without intention to limit the invention except as required by the prior art, the following example is included:

100 parts of crude balata may be softened in boiling water and after softening transferred to a suitable washer of the internal type. Any suitable type of internal mixer such as a Werner & Pfleiderer, Day or Universal washer or the like may be used and any convenient system for preparing and circulating hot water may be employed. The crude balata is preferably agitated in this washer at such a temperature that it is plastic and mills readily. One and one-half parts of sodium oleate may then be milled into the 100 parts of the crude balata and after the soap has been completely distributed .4 part of dry caustic soda added and milled into the mass. When the soap and caustic soda have been thoroughly distributed in the balata, the mixture may be agitated in circulating hot water until the wash water runs clear and until no traces of soap or alkali remain in the wash water. The above process of incorporating detergents by milling and then subsequently washing them out of the mixture with water may be repeated a number of times, if desired. When the balata has become sufficiently clean, it may be dried and the resins extracted from the dried balata with organic solvents in a manner well known in the art. It is not necessary to use a mixture of alkali and soap unless desired, and other soaps and other alkalies as above described may be used alone or in any desired combination, instead of in the specific combination shown in the above example. If alkali is used with the soap, the ratio of soap to alkali, and of course the ratio of both soap and alkali to the balata, may be varied as required for a single washing or for a number of washings, if such are necessary.

The principle of cleaning described in this invention is not alone applicable to balata, but can be applied to gutta percha and similar gums as well as off-grade rubbers, such as Roll Brown, Caucho, Niger Flake, etc., and synthetic rubber like products in general. The type of washer to be used and the temperature and conditions of operations vary with these different substances because the physical properties of these various substances differ widely, but the principle of incorporating an active detergent into the gum and subsequently washing out this detergent together with the foreign materials which are removed by the detergent can be used in the cleaning of these various products.

It is understood that the invention is not limited to the specific embodiment shown in the example as it will be evident to those skilled in the art that the invention permits of various modifications without departing from the spirit thereof, and it is my intention not to be limited in the scope of the invention except as required by the state of the art and as set forth in the claims.

Having thus described my invention what I claim and desire to protect by Letters Patent is:

1. The method of cleaning balata and like gums which comprises incorporating a solid detergent into the plastic gum, washing the said detergent and foreign substances out of the gum with water, drying the gum, and extracting the resins from the gum with organic solvents.

2. The method of cleaning balata and like gums which comprises milling a soap into the gum, washing the thus treated gum with water and extracting the resins from the gum.

3. The method of cleaning balata and like gums which comprises plasticizing the gum, milling a soap and an alkali into the gum, washing the said soap and alkali and foreign substances out of the gum with water, drying the thus treated gum, and extracting the resinous substances from the gum with organic solvents.

F. DUDLEY CHITTENDEN.